Figure 1:
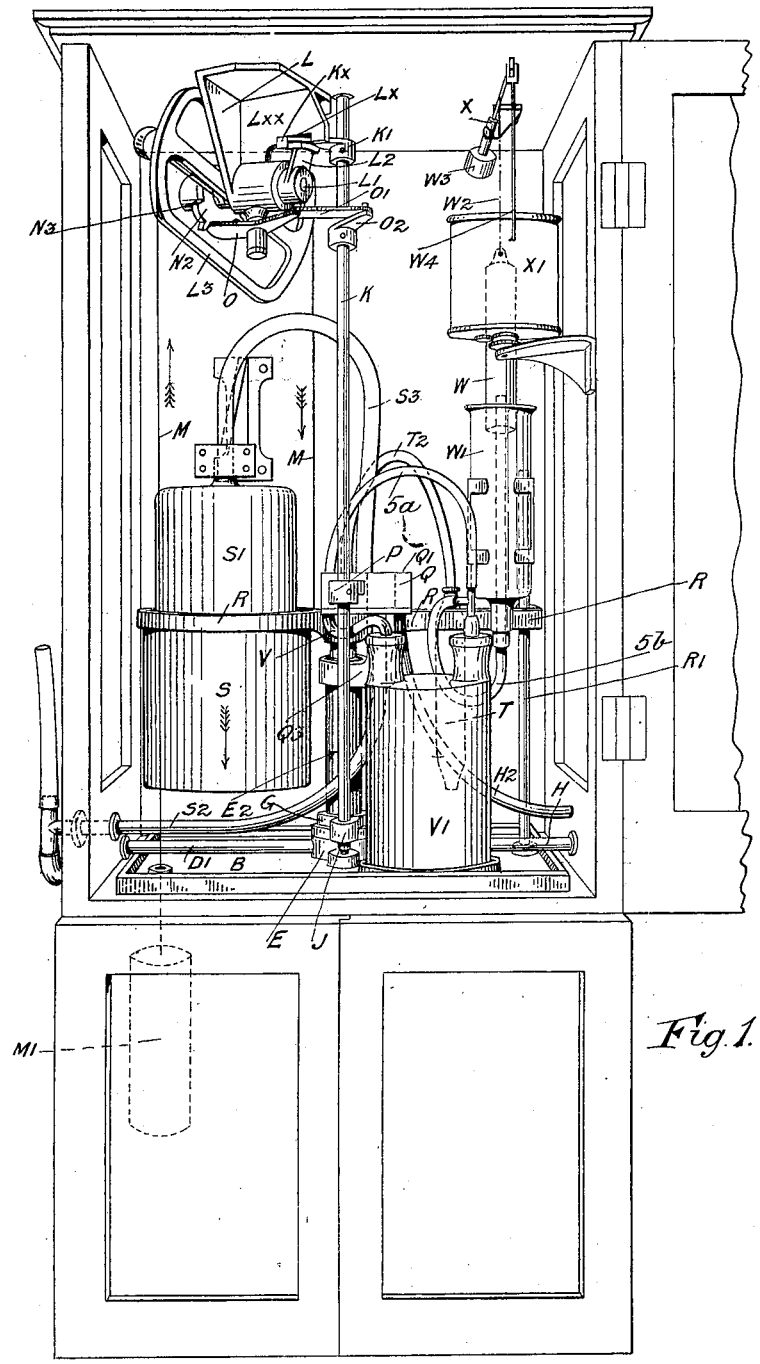

No. 897,900. PATENTED SEPT. 8, 1908.
W. S. HUBBARD.
APPARATUS FOR THE ANALYSIS OF GAS MIXTURES.
APPLICATION FILED AUG. 22, 1907.
MODEL. 4 SHEETS—SHEET 1.

No. 897,900. PATENTED SEPT. 8, 1908.
W. S. HUBBARD.
APPARATUS FOR THE ANALYSIS OF GAS MIXTURES.
APPLICATION FILED AUG. 22, 1907.
MODEL. 4 SHEETS—SHEET 2.

No. 897,900. PATENTED SEPT. 8, 1908.
W. S. HUBBARD.
APPARATUS FOR THE ANALYSIS OF GAS MIXTURES.
APPLICATION FILED AUG. 22, 1907.
MODEL. 4 SHEETS—SHEET 3.

No. 897,900. PATENTED SEPT. 8, 1908.
W. S. HUBBARD.
APPARATUS FOR THE ANALYSIS OF GAS MIXTURES.
APPLICATION FILED AUG. 22, 1907.
MODEL. 4 SHEETS—SHEET 4.
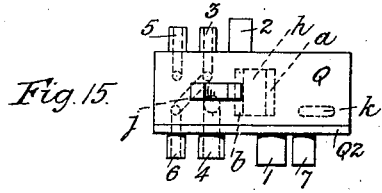
Fig. 15.
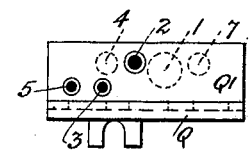
Fig. 12.
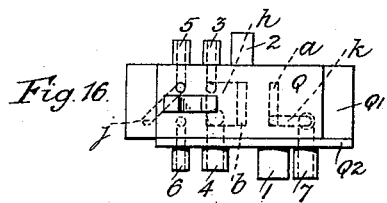
Fig. 16.
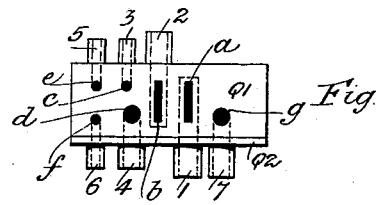
Fig. 13.
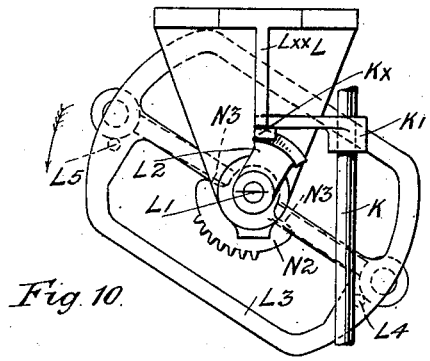
Fig. 10.
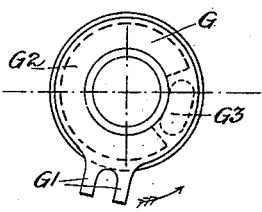
Fig. 14.
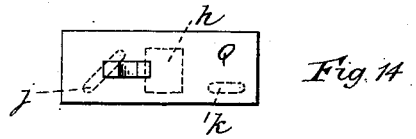
Fig. 5.
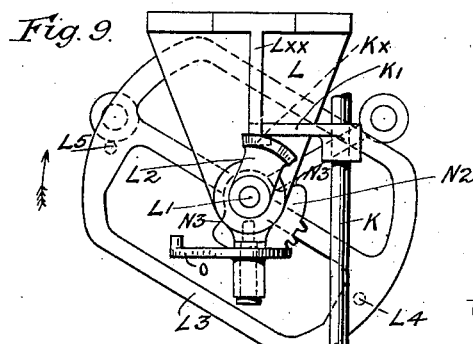
Fig. 9.
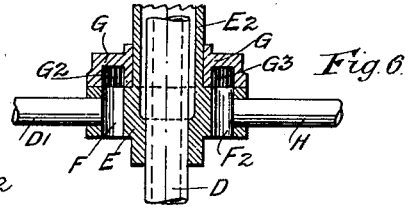
Fig. 6.
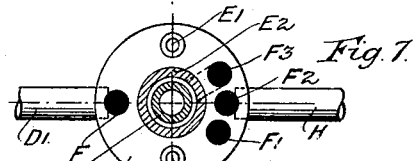
Fig. 7.
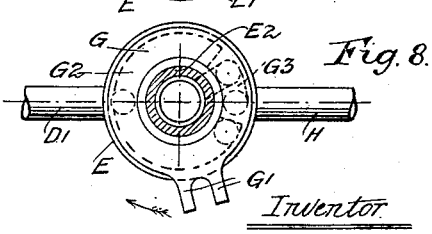
Fig. 8.
Fig. 11.
Witnesses.
Inventor
William Sammons Hubbard

UNITED STATES PATENT OFFICE.

WILLIAM SAMMONS HUBBARD, OF LEICESTER, ENGLAND.

APPARATUS FOR THE ANALYSIS OF GAS MIXTURES.

No. 897,900.  Specification of Letters Patent.  Patented Sept. 8, 1908.

Application filed August 22, 1907. Serial No. 389,705. Model.

*To all whom it may concern:*

Be it known that I, WILLIAM SAMMONS HUBBARD, a subject of the King of England, residing at Leicester, in the county of Leicester, England, have invented certain new and useful Improvements Relating to Apparatus for the Analysis of Gas Mixtures and Recording the Percentage Therein of One of the Gases; and I do hereby declare that the following is a full, clear, and exact description of the invention, such as will enable others skilled in the art to which it appertains to make and use the same.

The present invention consists of improvements relating to apparatus designed to automatically measure and analyze mixed gases and to automatically record the percentage therein of one of the gases.

The said apparatus is hereinafter described in respect of an embodiment of the invention for analyzing the percentage of $CO_2$ in the gases of boiler flues, though it is also applicable to other analogous purposes.

When applied for the particular purpose stated, the combustion of the fuel in the boiler furnace may be carefully observed and the draft of the chimney regulated to keep the percentage of $CO_2$ at the proper proportion to maintain an economical consumption of fuel; moreover my improved apparatus automatically and continuously records the aforesaid percentage by any pre-determined number of impressions per hour on a diagram.

The essential principle on which the apparatus works, is that $CO_2$ is absorbed by a solution, such as caustic potash. A portion of the flue gases is pumped or drawn into the apparatus and a portion of the said gases is measured off and passed over, or through, the absorbing solution which entirely removes the $CO_2$ from the measured quantity and the remaining gases are again automatically measured and the results recorded on a diagram which shows the percentage of the absorbed portion relative to the first measured quantity and consequently the percentage in the larger sample.

The action of the apparatus is continuous and the records are made at regular intervals which may however be varied.

The invention will be clearly understood by the following description, in which reference is made to the accompanying drawings, on the several sheets of which like parts are indicated by like reference characters, throughout all the figures of the drawings.

Figure 2:
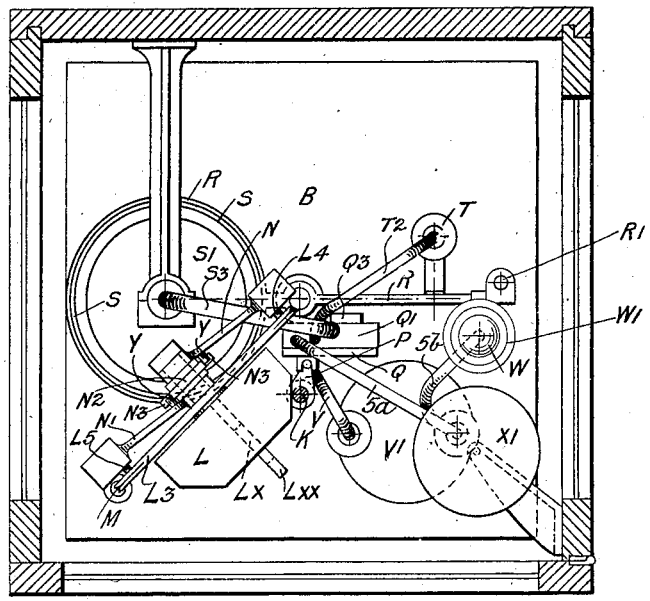
Figure 3:
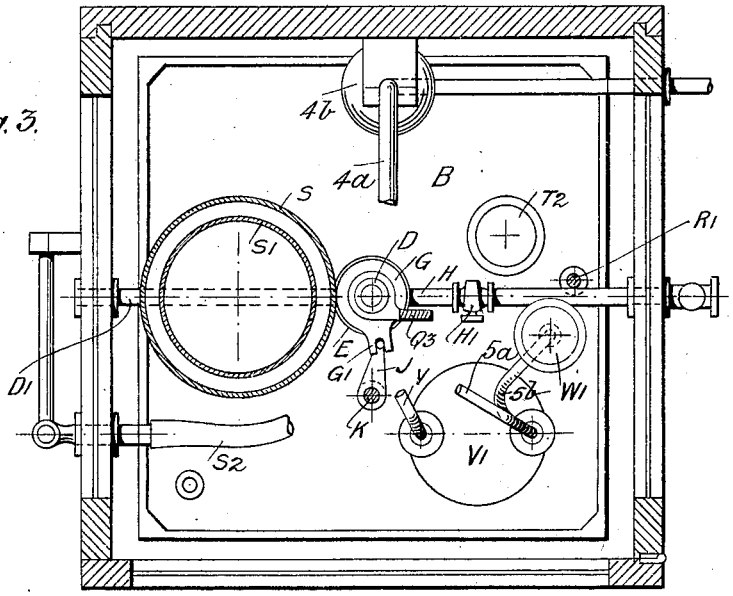
Figure 4:
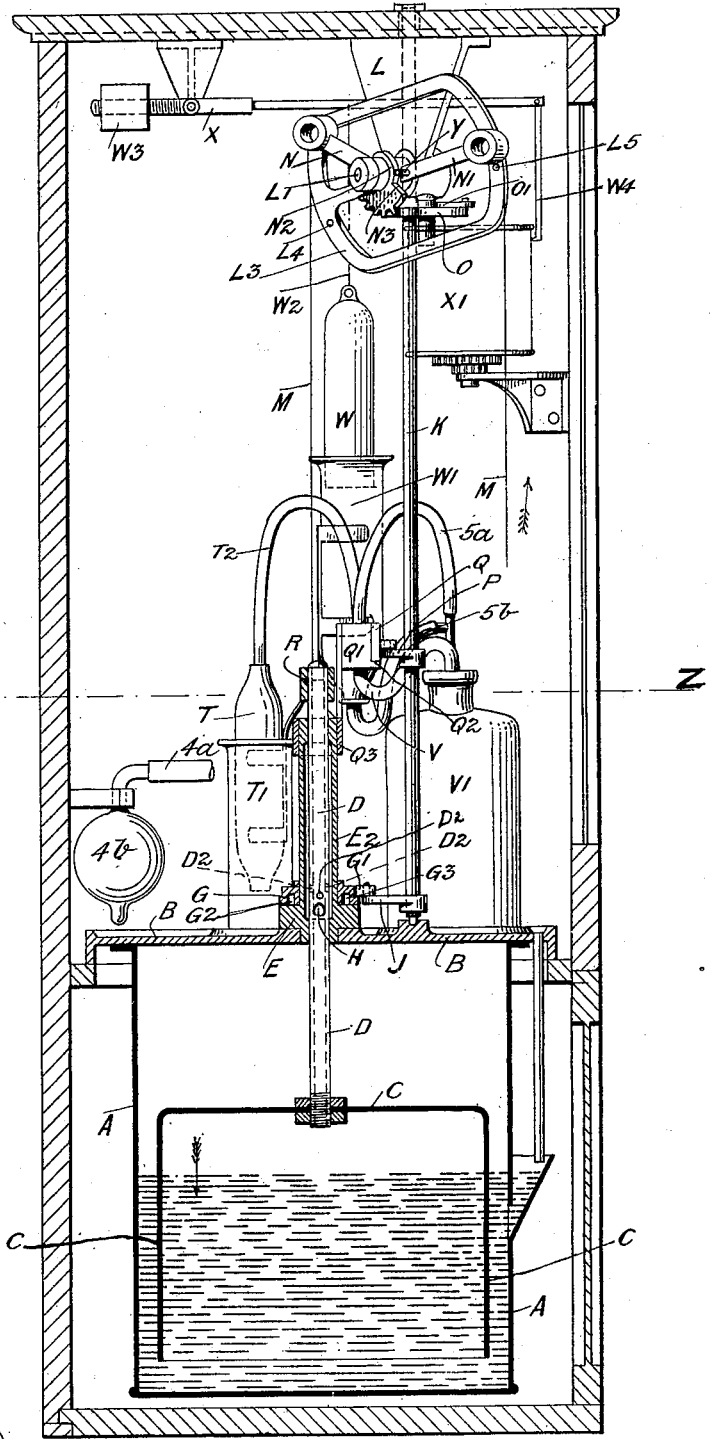

Referring to the said drawings:—Figure 1, is a perspective view of a complete apparatus constructed in accordance with one form of my present invention, the doors to the bottom part of the apparatus being closed and the motor out of view. Fig. 2, is a sectional plan taken on a line at the top of the apparatus. Fig. 3, is a sectional plan taken on the line Z—Z of Fig. 4. Fig. 4, is a sectional side elevation of the apparatus. Figs. 5, 6, 7 and 8, are detail views of the valve for controlling the motor. Figs. 9, 10 and 11, are enlarged views of the parts for effecting the reversal of movement of the parts controlling the analyzing apparatus. Figs. 12 to 16, inclusive, show the valve and laterally operated slide which operates to direct the gases into the various channels.

The motor, (see Fig. 4,) comprises the closed cylindrical body A, which is attached and sealed to the underside of the plate B, and in the said body A is located the bell C, to which is connected the hollow spindle D, which extends upwards, as shown, and has a stopped upper end.

To raise and lower the bell C, through which movement is imparted to various parts of the apparatus, air is sucked from the top and the interior of the said bell C, alternately. For this purpose a pipe $D^1$, open to the atmosphere, is connected to the motor valve E, which latter is fixed in position by screws passing through the holes $E^1$, into the plate B. The said valve E is provided with ports F, $F^1$, $F^2$, $F^3$, and the latter port ($F^3$) communicates with the interior of the sleeve $E^2$ of the valve E. Seated on said valve E is a slide G provided with lugs $G^1$, and having two circular ports $G^2$, and $G^3$, separated from each other,—(see Figs. 5 and 8). When the slide G is in the position shown in Fig. 5, air is drawn into the interior of the bell C, through the pipe $D^1$, through the port F of the valve E, into the port $G^2$ of the slide, through the port $F^3$ into the sleeve $E^2$ and through openings $D^2$, (see Fig. 4) in the hollow spindle D, into the interior of the bell C, and allows the latter to ascend until at a pre-determined point, the reversing mechanism comes into action and, through means hereinafter described, moves the slide G until the port $G^3$ is over the ports $F^2$, $F^3$ in the motor valve G (see Fig. 8) when, the chimney sucking through the pipe H and drawing the air from the interior of the bell C, causes the latter to descend. The pipe H which connects the motor valve E with the chimney can be regulated by a cock H¹, (see Fig. 3) to control the vacuum or draft to the chimney, so that although the action of the apparatus is continuous, the length of time or duration of each operation may be regulated to attain any desired number per hour, each operation being of equal duration. It will be obvious that other arrangements may be made so as to act upon and raise and lower the bell C. It will also be obvious that the lesser the vacuum or draft, the slower the working of the apparatus with a proportionate difference in the recordings or impressions made on the diagram per hour.

The rotary valve E described and shown is the preferred form for my present purpose, but it is obvious that a valve may be so arranged, that the slide or movable part, such as G, may have a lateral movement imparted by any suitable means.

The slide G of the motor valve E is actuated by a lever J, fixed on a rod K supported in a boss on the plate B and on the upper end of said rod K is fixed a lever K¹, which has a limited movement and is operated by means now to be described.

To the top of the casing of the apparatus there is fixed a bracket L (see Figs. 1, 2, 4, 9, and 10,) and said bracket supports a spindle L¹, on which are fixed a cam lever L² and counterpoise L³, and the said counterpoise is actuated by a cord or equivalent M, from one end of which is suspended a counterweight M¹ (see Fig. 1) and the other end of which is attached to the vertical reciprocating body hereinafter described. As the latter ascends actuated by the motor bell C or equivalent means, the counterpoise L³ and lever L² turns with the spindle or axis L¹. Freely mounted on the spindle L¹ are two levers N, N¹, and a toothed cam N², and gearing with the teeth of the said cam N², is a segmental lever O, suitably pivoted and connected by a link O¹ to a lever O², fixed on the rod K. The counterpoise has two pins L⁴, L⁵ and the toothed cam N² is provided with the shoulders N³. During the reciprocating movement of the counterpoise L³, the pins L⁴, L⁵, thereon, alternately lift the levers N, N¹, respectively and carry them upward to a point where the cam lever L² passes clear of the nose K× of the lever K¹, whereupon one of the aforesaid levers which has been held suspended by a pin Y on a shoulder N³ of the toothed cam N² immediately drops and moves the said cam N², which in its turn moves the segmental lever O, link O¹, and lever O², thereby slightly turning the vertical rod K.

The lever K¹ has a definite amount of movement in a recessed portion L× of the web L×× of the bracket L, (see Fig. 1.)

The mechanism just described is arranged to effect control over the entire working of the analyzing and recording apparatus through the medium of a lever P, fixed on the rod K, which said lever P engages and actuates the slide Q of the valve box Q¹ fixed by the arm Q³ to the sleeve E² of the motor valve E. The slide Q is moved rapidly across the face of the valve box Q¹ and opens certain ports in the said box to other ports therein and so forms passages or opens the various connecting pipes to measure and analyze the gases.

In analyzing gases other than those in boiler flues, or where no chimney vacuum or draft is available, I may use a cam or other suitable arrangement driven by power to provide an exact stroke vertical reciprocating motion in place of the bell and vessel hereinbefore described.

The vertically reciprocating body before mentioned comprises an arm R, fixed on the upper end of the hollow spindle D, and on said arm are carried the vessels S, T, W¹, all of which are suitably fixed to the said arm R which ascends and descends with the bell C of the motor, and is guided by the fixed rod R¹.

The pump consists of the vessel S carried by the said vertically reciprocating body R. The said vessel S, is filled with liquid and has the bell S¹ suspended therein, and the vessel S in its vertical reciprocating movement draws gas from the boiler flue to be measured and analyzed, through the pipe S³ attached to the nozzle 2. The pipe S² connects the boiler flue with the nozzle 1 on the valve box Q¹, shown enlarged in Figs. 12 to 16. It will be seen that the said box is provided with two long vertical ports $a$, $b$, and five small ports $c$, $d$, $e$, $f$, and $g$, all of which are on its face and opened and closed by the lateral movement of the slide Q. The slide Q rests on a projection Q² and is held to the face of the valve Q¹ by capillary attraction. Suitable nozzles numbered 1, 2, 3, 4, 5, 6 and 7, are provided on the top and bottom of the said valve box Q¹ to which the various pipes connecting up the apparatus are attached and which will be referred to by a designating character as each part is described.

In Figs. 12, 15 and 16, the slide Q and valve box Q¹ are shown side by side and Figs. 13 and 14 show the said parts detached from each other, to prevent any confusion of lines. The slide Q is provided with the ports $h$, $j$, $k$, and at the moment of reversal of movement the said slide Q is instantaneously moved along the face of the valve Q¹ to reverse the direction of movement of the gases throughout the entire apparatus.

After being pumped into the apparatus a portion of the gases passes to the vessel T and the remainder to the atmosphere. A pipe T² connected to the nozzle 3 allows a portion of the gases to pass therefrom into the top of the vessel T, preferably formed of glass and which is carried on the vertically reciprocating arm, and ascends and descends therewith into an open top vessel T¹, containing any suitable liquid. As the said vessel T rises in the liquid contained in the vessel T¹, a portion of the flue gases to be analyzed takes the place of the liquid in the vessel T and the "stroke" being exact for the reason before stated, it follows that an exact quantity of gas is measured. The area at the top and bottom of the vessel T is contracted, as shown in Figs. 1 and 4, in order to render the measurement of the gases as exact as possible. The said connection between the nozzle 3 and the vessel T is also alternately in and out. As the water rises in the glass measurer T during the descent of the latter, the gases therein are displaced and returned through the aforesaid connection 3, through the valve box Q and out through the nozzle 6 (see Fig. 15) and through a pipe V to the top side of a vessel V¹, containing suitable absorbing liquid, such as caustic potash.

The connection to the nozzle 4 by which the surplus gases received from the pump pass into the open air, is made by a pipe 4ª, which connects to the said nozzle 4 and also connects up to a bulb 4ᵇ, which serves as a reservoir for a supply of gas to be drawn upon when the liquid in the vessel S falls at the end of the stroke. The pipe 5ª, also connecting the nozzle 5 of the valve box Q to the absorbing container or vessel V¹, has a connection 5ᵇ, leading to the underside of a suspended bell W, which becomes immersed in a vessel W¹ of liquid as the said vessel W¹ ascends and descends, with the vertically reciprocating body actuated by the motor, the said vessel receiving the flue gas as it leaves the absorbing vessel V¹.

The quantity of gas displaced by the aforesaid suspended bell W must be slightly more than the capacity of the bell or vessel T used for measuring the gas. The said bell W, is suspended by a chain W², from a pivoted lever X, counterweighted at W³ and adjustable to render it sensitive in all its functions, for the reason that it carries on its front end the arm W⁴ to which is fixed the pen for making the impressions on the specially ruled diagram which is placed around the cylindrical body X¹, automatically rotated by suitable mechanism. It will be understood that when the suspended bell W during the downward movement of the vertically reciprocating body R, receives the same quantity of gas as displaced by the measuring vessel T, that the said bell W is only pulled down sufficiently to remove any back lash or play which may be in the pins or joints of the suspending lever X. The mechanism is so designed that in this case it shall pull the pen down to a zero line on the rotating diagram, but if during the passage of the gas from the measurer T to the bell W, a portion of the gas is removed, then the bell W is pulled down proportionately lower according to the amount of such gas removed, and the diagram is suitably graduated to indicate this. A feature of the diagram is a series of markings showing at a glance the percentage of absorbed $CO_2$ present in the sample or drawn from any source, or when the apparatus is used on boiler flues, a special diagram may be used, showing the percentage of fuel which is being wasted.

A connection is made between the nozzle 5 on the valve box Q¹ and the absorbing vessel V for the purpose of allowing the gas, after measurement and during the upward stroke of the bell T, to be discharged into the air, the port $j$ on the slide Q being alternately open to the atmosphere (see Fig. 16).

As before stated, the vertically reciprocating body R has a counterbalance M¹ attached thereto and the parts movable with the aforesaid body are connected to all the several stationary parts by flexible connections.

The nozzle 7 has a pipe H² forming a connection therefrom to the pipe H communicating with the chimney. The said nozzle 7 is caused to communicate with the flue pipe S² by means of the port $k$ on the slide Q. By this arrangement when the flue gas is not being pumped, the sample of gas is kept moving and fresh by the connection to the chimney pipe H.

A suitable filter is fixed on the pipe which connects the flue gas with the apparatus.

I am aware that apparatus for affording an indication in accordance with which steam boiler and other fires may be controlled, consisting of a small bell motor, and of an apparatus driven by said motor and connected with the flue of the fire to be controlled and at certain intervals to obtain tests of smoke gas. I therefore do not claim broadly such a combination, but

I claim:—

1. In apparatus for automatically analyzing mixed gases and indicating the proportion of one of them, an operated spindle having exact vertical stroke, an operated valve having quick movement at each end of the spindle stroke, a gas pump, a valve and valve box with ports for distributing the gases, a measuring vessel, a re-measuring vessel with means attached thereto for indicating on a moving chart the proportion of gas absorbed, substantially as described.

2. In apparatus for automatically analyzing mixed gases and indicating the proportion of one of them, an operated spindle having exact vertical stroke, an operated valve having quick movement at each end of the spindle stroke, means for introducing and expelling the gases to be analyzed through the distributing valve box to and from the fixed gas pump bell, liquid sealed in tank having exact vertical stroke, means for expelling and supplying at atmospheric pressure a portion of the gases to the first measurer for analysis and the remainder to the atmosphere, a valve and valve box with ports for distributing the gases, a measuring vessel, an absorption vessel, a re-measuring vessel with means attached thereto for indicating on a moving chart the proportion of gas absorbed, substantially as described.

3. In apparatus for automatically analyzing mixed gases and indicating the proportion of one of them, an operated spindle having exact vertical stroke, an operated valve having quick movement at each end of the spindle stroke, a gas pump, a valve box with ports, a valve having quick movement sliding thereon, means for conveying gases, to be analyzed to and from pump bell, to air, to and from first measurer, to absorber and second measurer, means for expelling gases remaining after absorption from the second measurer to atmosphere, an absorption vessel, a re-measuring vessel, with means attached thereto for indicating on a moving chart the proportion of gas absorbed, substantially as described.

4. In apparatus for automatically analyzing mixed gases and indicating the proportion of one of them, an operated spindle having exact vertical stroke, an operated valve having quick movement at each end of the spindle stroke, a gas pump, a valve and valve box with ports for distributing the gases, means for introducing and expelling a portion of the pumped gas into the first measurer having contracted ends attached to spindle and having exact vertical stroke in liquid in fixed tank, means for conveying the expelled gases from the first measurer through the distributing valve on to the absorbing vessel nearly filled with absorbing liquid, means for conveying the remaining gases after absorption to a re-measuring vessel with means attached thereto for indicating on a moving chart the proportion of gas absorbed, substantially as described.

5. In apparatus for automatically analyzing mixed gases and indicating the proportion of one of them, an operated spindle having exact vertical stroke, an operated valve having quick movement at each end of the spindle stroke, a gas pump, a valve and valve box with ports for distributing the gases, a measuring vessel, an absorption vessel, means for conveying the remaining gases after absorption to the underside of a liquid sealed re-measuring bell suspended in tank attached to spindle having exact stroke, bell suspended to a balanced lever with pen and means for recording on a moving chart the extent of its descending movement when the re-measuring vessel does not receive the same quantity of gas as was expelled by the first measurer, means for connecting to the air the pipe from the absorbing vessel to the re-measuring vessel through valve box and valve, after the record has been made on the moving chart, substantially as described.

In witness whereof I have signed my name to this specification in the presence of two subscribing witnesses.

WILLIAM SAMMONS HUBBARD.

Witnesses:
ARTHUR B. TALBOT,
WALTER W. BALL.